March 26, 1963 G. L. EARP-THOMAS 3,082,542
BACTERIOLOGICAL DIGESTER FOR CONVERSION OF ORGANIC WASTE
Filed Dec. 18, 1959 3 Sheets-Sheet 1

INVENTOR.
George L. Earp-Thomas
BY H. Lee Helms
ATTORNEY.

March 26, 1963     G. L. EARP-THOMAS     3,082,542
BACTERIOLOGICAL DIGESTER FOR CONVERSION OF ORGANIC WASTE
Filed Dec. 18, 1959     3 Sheets—Sheet 2
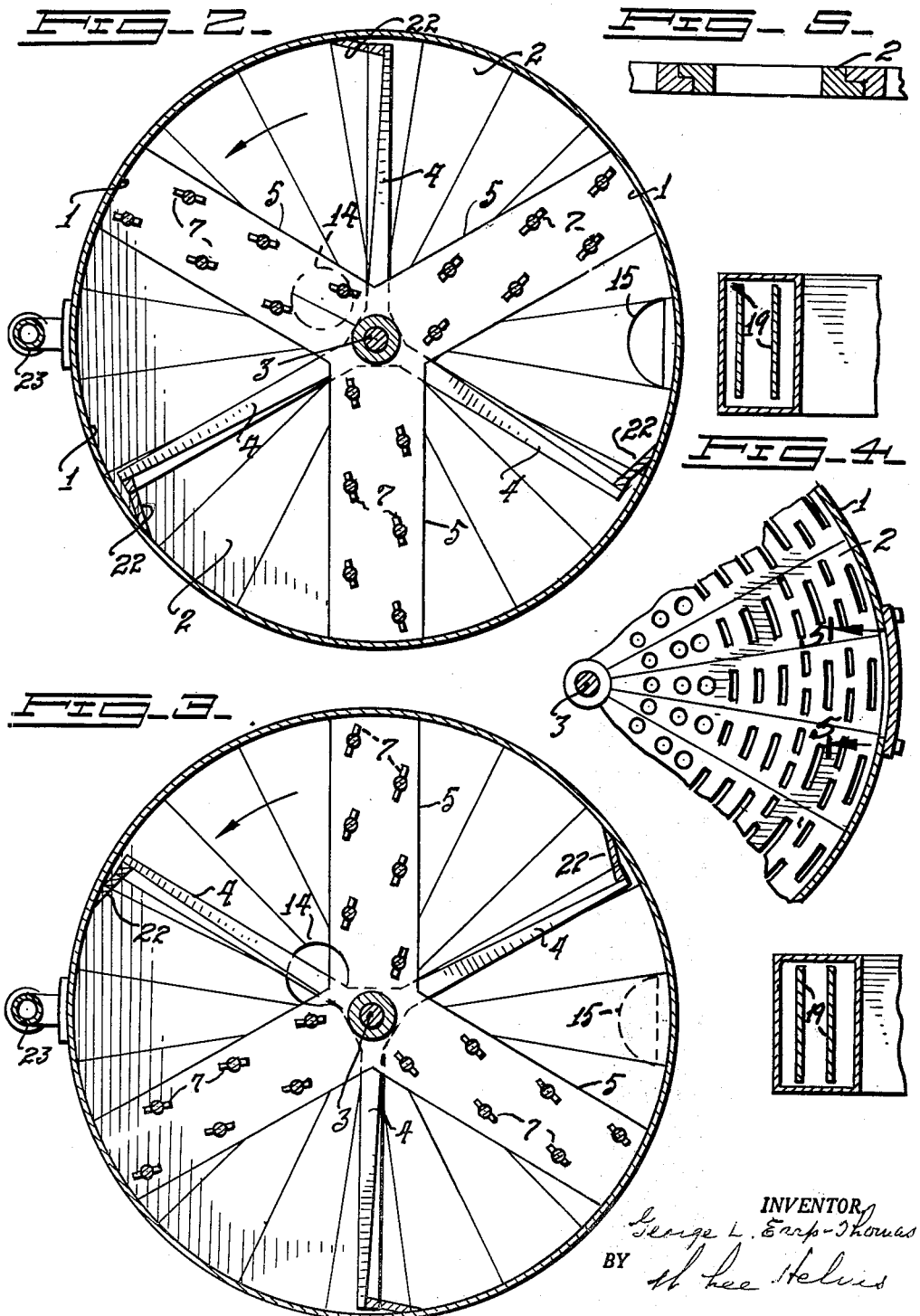
INVENTOR
George L. Earp-Thomas
BY
ATTORNEY.

March 26, 1963 G. L. EARP-THOMAS 3,082,542
BACTERIOLOGICAL DIGESTER FOR CONVERSION OF ORGANIC WASTE
Filed Dec. 18, 1959 3 Sheets-Sheet 3
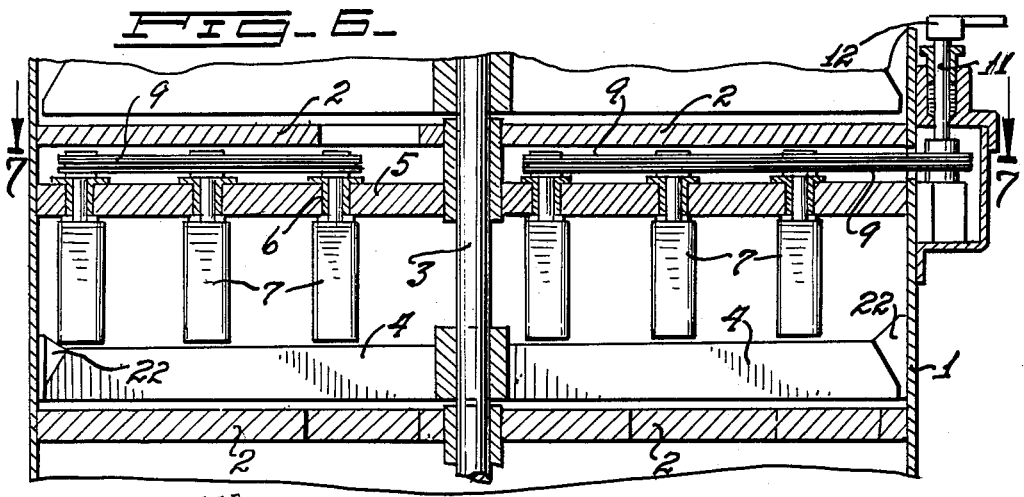
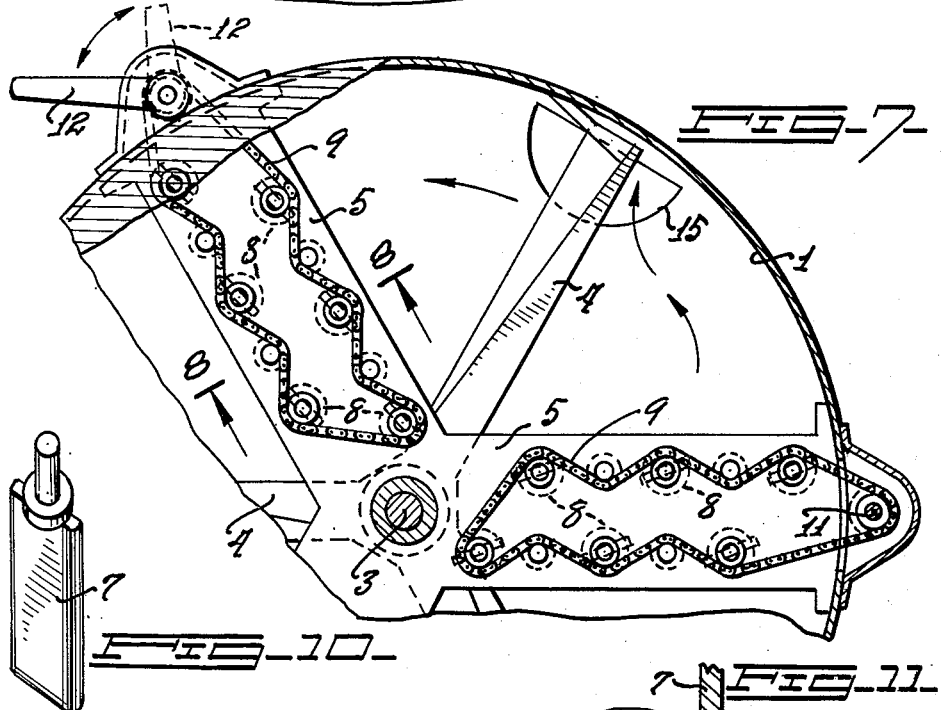
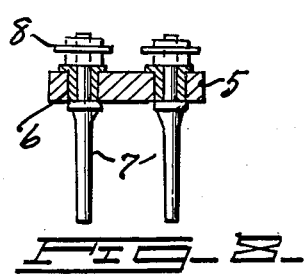
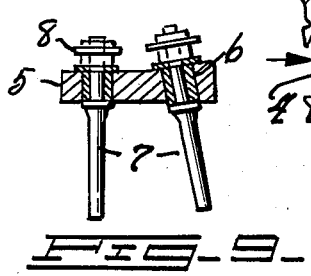
INVENTOR.
George L. Earp-Thomas
BY H. Lee Helms
ATTORNEY.

United States Patent Office 3,082,542
Patented Mar. 26, 1963

3,082,542
BACTERIOLOGICAL DIGESTER FOR CONVERSION OF ORGANIC WASTE
George L. Earp-Thomas, County of Hunterdon,
High Bridge, N.J.
Filed Dec. 18, 1959, Ser. No. 860,421
3 Claims. (Cl. 34—173)

This invention relates to a new and improved means for the transformation of organic material such as leather scrap, blood, tankage, bagasse, sewage sludge, fish waste, etc. into a fertilizer product.

More particularly the invention consists in improvements on and additions to the method and means for rapidly digesting such waste material disclosed in Patent No. 2,178,818. The means disclosed in said patent comprises a multideck digester through which the waste material is propelled and wherein said material is processed through several stages of digestion.

One object of the invention is the provision of improved driving means for propelling the waste material through the digester. Other objects will be described, with reference to the accompanying drawings, in which:

FIG. 2 is a horizontal section, on the line 2—2, FIG. 1.

FIG. 3 is a horizontal section on the line 3—3, FIG. 1.

FIG. 4 is a fragmentary detail view in plan, showing apertured deck plates.

FIG. 5 is a vertical section on the line 5—5, FIG. 4.

FIG. 6 is a fragmentary vertical section near the top of the apparatus showing means for adjusting the angle of the plows.

FIG. 7 is a fragmentary horizontal section on the line 7—7, FIG. 6.

FIG. 8 is a detail view, partly in section showing two plows edgewise and their mounting arrangement.

FIG. 9 is a view similar to FIG. 8 showing one of two plows angularly mounted.

FIG. 10 is a perspective view of one of the plows.

FIG. 11 is a schematic view in vertical section showing material being acted upon by the propeller and a plow.

Figure 1:
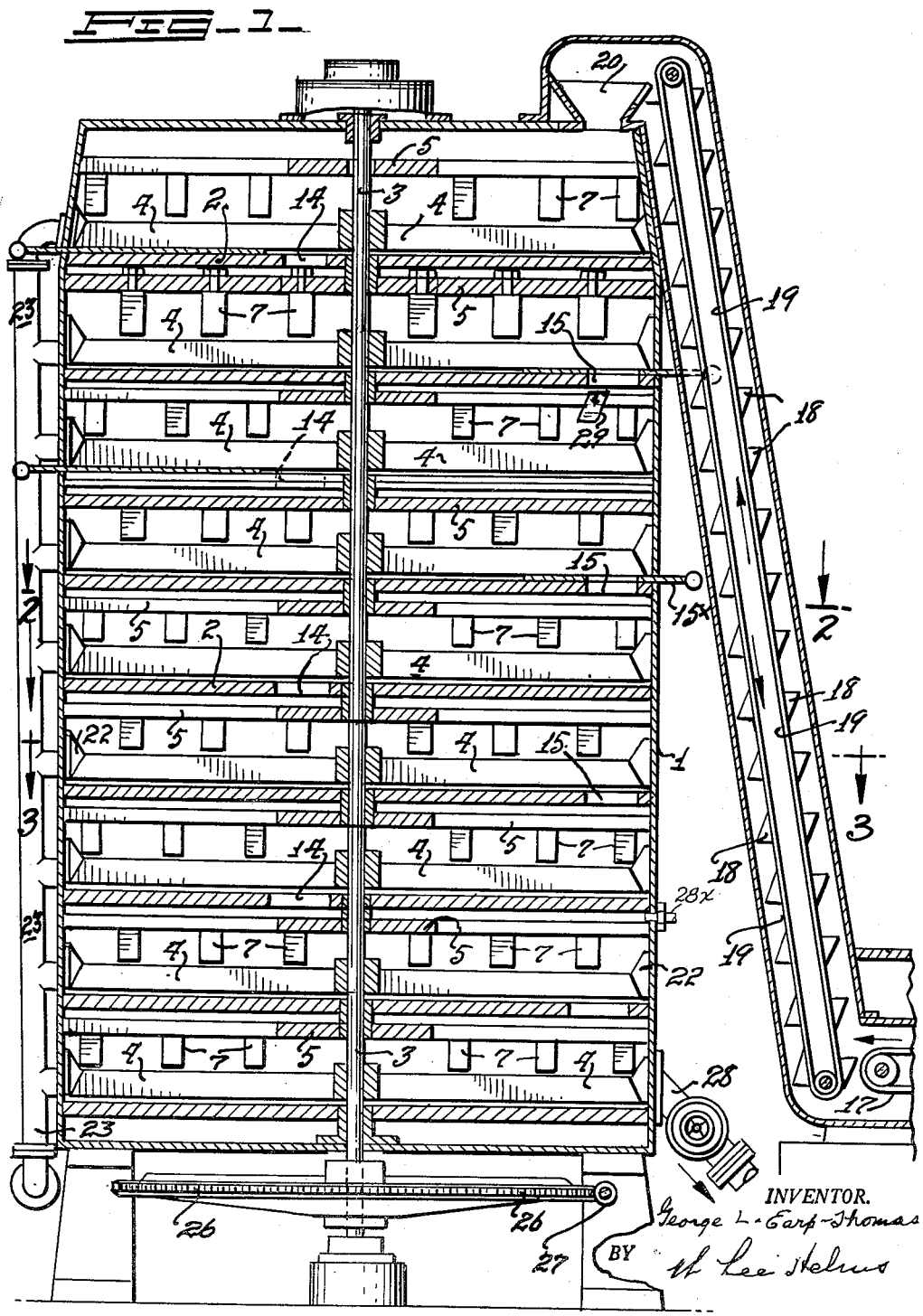
FIG. 1 is a vertical section through an embodiment of the invention.

Referring to the drawings I have shown at 1, a cylindrical tower, having a plurality of decks 2 which are preferably formed of perforated sections as shown in FIGS. 4 and 5. Driven by a vertical shaft 3 is a propeller 4 above each deck and close thereto. This propeller may have three blades as shown in FIGS. 2 and 3 but the number of blades may be as desired. The front edge of each blade rises at an angle so that it slopes rearwardly as shown more particularly in the cross section of, FIG. 11.

Above each propeller 4 are spaced carrier arms 5 which are fixed in position and formed with a number of bearing apertures which receive bearings 6 for the hubs of plows 7. The top of each hub carries a gear 8 and at each arm 5 these gears are engaged by a chain 9 leading exteriorly of the tower 1 and onto the operating gear of a manually operable shaft 11 having a handle 12. By this means any group of plows, or all of the plows, may be angularly adjusted.

Reference to FIG. 1 will show that the uppermost deck 2 has a discharge aperture at 14 near shaft 3 while the second uppermost deck has a discharge at 15 near the inner wall of tower 1. The apertures in the successive decks likewise alternate in position, so that the material being acted upon is discharged from one deck to a second deck away from the discharge aperture of the second deck. These apertures are controlled by shut-off dampers at selected or all of the discharge apertures as at 15$^x$.

The material for digestion is usually ground and deposited upon an endless belt 17 which carries the material to elevator buckets 18 on driven endless carrier 19, and at the top of the tower the material is dumped into a receiving funnel 20.

The material for digestion will have added thereto, in usual practice, aerobic bacteria, which multiplies rapidly as the material passes from the upper to the lower decks. Bacterial oxidation rises rapidly with a rise in temperature, so that no applied heat is necessary.

The action of the propeller blades 4 is to raise the material under treatment upwards and over the blade and at the same time to move the material forwardly on the decks. It is preferred that the propeller blades carry scrapers 22 at their ends which engage the inner wall areas of the tower 1. These scrapers may, if desired, extend upwardly, in each case, to lie close to arms 5 for the plows. The propeller-carrying shaft 3 is driven by the engagement of a worm-wheel 26, with a worm 27, FIG. 1, driven by a suitable motor.

The plows are made adjustable in order that they can be turned to speed up or slow down the passage of the material under treatment to the discharge openings of the several decks. In other words the propeller blades act to both raise the material and to force the same against the plows which direct the material to discharge openings, and both the propellers and the plows agitate and open up the material under treatment, for aeration.

Air may be passed into the tower via a duct 23. This duct has a branch for each deck, as shown in FIG. 1 for the flow of air thereto. An arrangement for withdrawal of vapors and gases may be provided at the opposite side of the tower, a duct 28$^x$ being shown for the purpose.

The finally treated material, ready for bagging, is delivered through a suitable discharge port as at 28, FIG. 1.

A fixed leveling blade is preferably carried on each of a plurality of the arms 5 as indicated at 29, FIG. 1, and which blade is sloped toward the appropriate opening 14 or 15 in the underlying deck opening. For clarity of illustration, only a single one of these leveling devices is shown.

Having described my invention, what I claim and desire to secure by Letters Patent is as follows:

1. A bacteriological digester for conversion of organic material, comprising a tower, horizontal floors dividing the tower into a plurality of superposed chambers, said tower having an inlet at its top, for reception of organic matter to be acted upon, and a discharge port at its bottom, duct means on the tower for passage of air into said chambers, a driving shaft extending vertically and concentrically within the tower and bladed propellers thereon, and disposed immediately above each floor, and vertically axised in close proximity to the floor with a rearwardly inclined material-engaging face in respect to its direction of rotation to lift material off the floor, passageways, for the organic material, being formed in the floors for discharge of the organic material from the top floor to the remaining floors in succession and to said discharge port, means for rotating the propeller, a plurality of agitating ploughs for each floor area, such ploughs being disposed above the propeller at each floor, and held by the tower against translatary bodily movement, and a duct communicating with the interior of the tower near its base for outward flow of vapors and gases.

2. A bacteriological digester for conversion of organic material, constructed in accordance with claim 1, in combination with arms carried by the tower for holding the ploughs at each floor for rotationed movement, gears carried by the ploughs, chain means engaging the gears and extending exteriorly of the tower, and a manually operable shaft carrying an actuating gear engaging the chain for the ploughs at a point exteriorly of the tower.

3. A bacteriological digester for conversion of organic material, constructed in accordance with claim 1, in combination with means for rotating the propellers consisting of a driving shaft extending vertically and concentrically within the tower, a plurality of arms above each propeller and carried in fixed position by the tower, a plurality of said ploughs being carried by each arm, means operable at a point exteriorly of the tower for adjusting the angle of said plurality of ploughs relatively to its carrying arm, the said floor passageways for the organic material being alternately located near the shaft and near the inner wall of the tower.

References Cited in the file of this patent

UNITED STATES PATENTS

| | | |
|---|---|---|
| 864,186 | Ostertag | Aug. 27, 1907 |
| 1,866,297 | Coursey | July 5, 1932 |
| 2,031,122 | Mueller | Feb. 18, 1936 |
| 2,178,818 | Earp-Thomas | Nov. 7, 1939 |
| 2,293,728 | Freund | Aug. 25, 1942 |
| 2,525,842 | Thompson et al. | Oct. 17, 1950 |
| 2,611,975 | Taylor | Sept. 30, 1952 |
| 2,639,901 | Teale | May 26, 1953 |

FOREIGN PATENTS

| | | |
|---|---|---|
| 32,935 | Germany | Jan. 31, 1885 |